(No Model.) 3 Sheets—Sheet 1.

J. M. FINCH.
DUST COLLECTOR.

No. 325,521. Patented Sept. 1, 1885.

Witnesses:
Chas. J. Buchheit
Theodore L. Popp

J. M. Finch, Inventor,
By Wilhelm & Bonner,
Attorneys.

(No Model.) 3 Sheets—Sheet 2.

J. M. FINCH.
DUST COLLECTOR.

No. 325,521. Patented Sept. 1, 1885.

(No Model.)  J. M. FINCH.  3 Sheets—Sheet 3.
DUST COLLECTOR.

No. 325,521.  Patented Sept. 1, 1885.

UNITED STATES PATENT OFFICE.

JOHN M. FINCH, OF JACKSON, MICHIGAN, ASSIGNOR TO THE KNICKERBOCKER COMPANY, OF SAME PLACE.

DUST-COLLECTOR.

SPECIFICATION forming part of Letters Patent No. 325,521, dated September 1, 1885

Application filed May 15, 1885. (No model.)

*To all whom it may concern:*

Be it known that I, JOHN M. FINCH, of Jackson, in the county of Jackson and State of Michigan, have invented new and useful Improvements in Dust-Collectors, of which the following is a specification.

This invention relates to an improvement in the class of machines which are employed in mills, factories, &c., for separating dust from air; and the object of the invention is to accomplish the separation in a simple, practical, and inexpensive manner.

Heretofore it has been attempted to separate the dust from the air by compelling the dust-laden air to assume a rotatory motion, either by revolving fan-blades or by its own momentum, thereby imparting to the particles of dust a centrifugal movement which drives them against a perforated case, which separates the current of moving air from a dead-air chamber. The separation of dust from air, therefore, takes place only from the fact that the particles of dust, having greater specific gravity than air, tend to follow their lines of direction and so pass through the perforations. In practice I find that much of the dust is of so slight gravity that the moving current of air overcomes the centrifugal force, and that therefore this light dust is carried forward to the outlet by the moving current and escapes from the machine with the air, whereby the object of the machine is to a large extent defeated.

The object of my invention is to overcome this difficulty; and it consists of a machine by which the dust is separated from the air by imparting to the dust-laden air-current a rapid rotative motion in a suitable separating-case, thereby causing the dust particles to seek the outer edge or layer of the revolving current and accumulate in the same, then removing or skimming off the outer layer or stratum of air containing the dust through one or more apertures or slots in the case into a dust chamber, in which the air-current entering with the dust is permitted to expand and come to a state of comparative rest, whereby the dust is deposited in said chamber while the air is permitted to escape therefrom, as will be hereinafter fully set forth, and pointed out in the claims.

Figure 1:
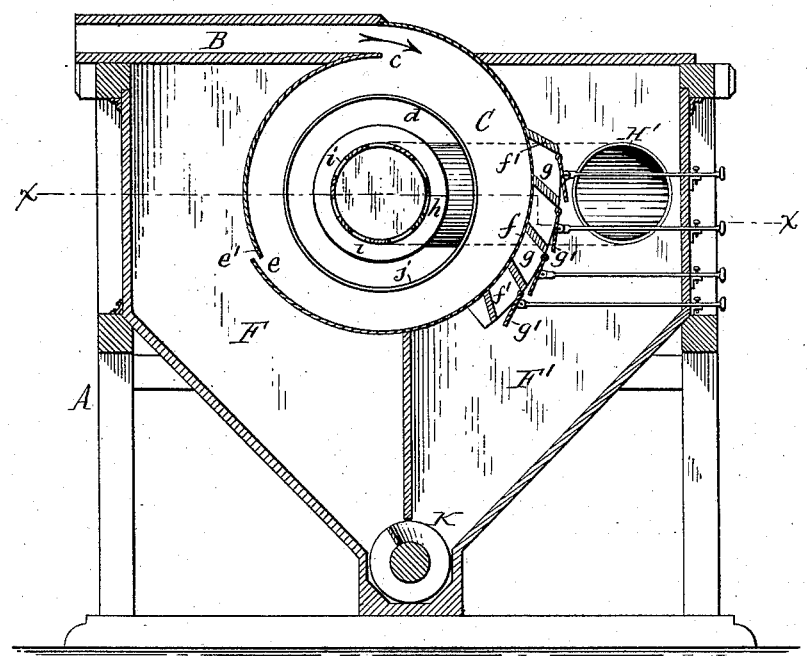
Figure 2:
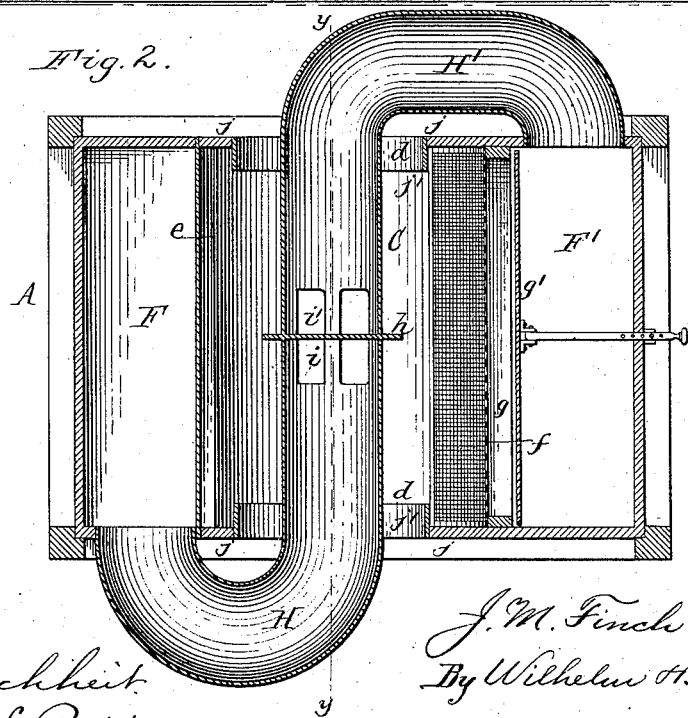
Figure 3:
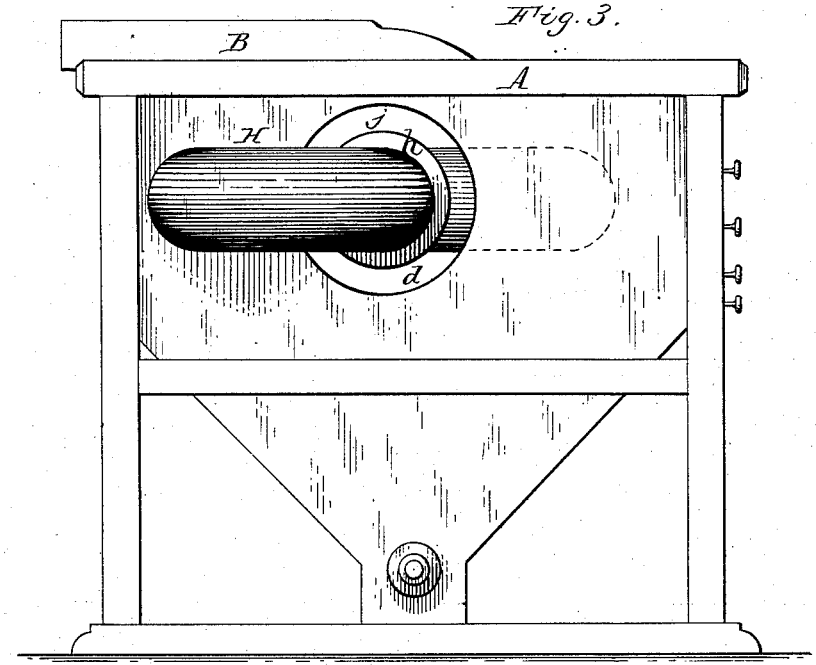
Figure 4:
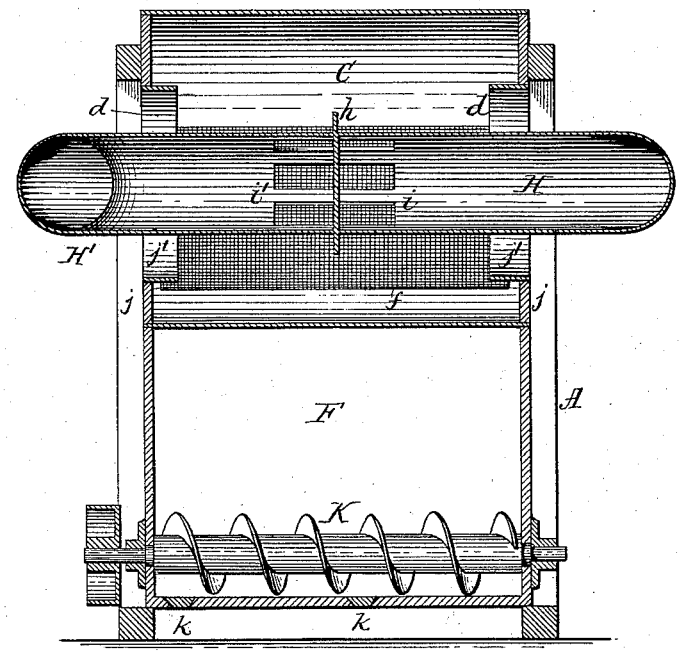
Figure 5:
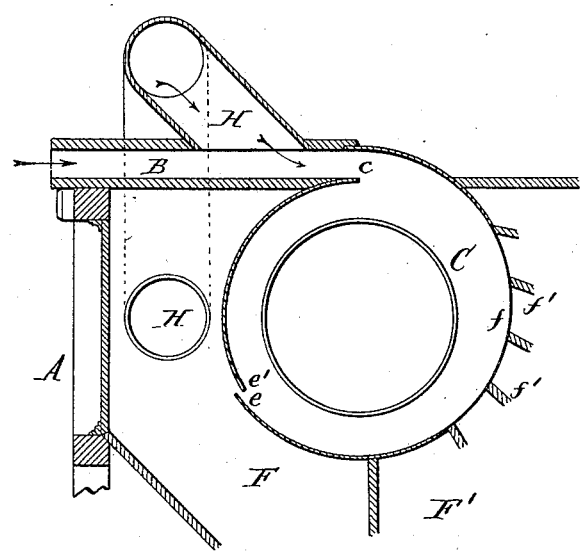

In the accompanying drawings, consisting of three sheets, Figure 1 is a sectional elevation of my improved dust-collector. Fig. 2 is a horizontal section in line $x$ $x$, Fig. 1. Fig. 3 is a side elevation of the machine. Fig. 4 is a vertical section in line $y$ $y$, Fig. 2. Fig. 5 is a sectional elevation showing a modified construction of the machine.

Like letters of reference refer to like parts in the several figures.

A represents the stationary frame of the machine, and B represents the air spout or trunk through which the dust-laden air enters the machine, and which is connected with the middlings-purifier, grain-separator, or other machine from which the dust-laden air is discharged.

C is an approximately cylindrical separating-case, arranged, preferably, horizontally and connected with the air-spout B, to receive the dust-laden air therefrom through the inlet-opening $c$. The spout B is arranged tangentially to the separating-case C, so that the dust-laden air which enters the case C from the spout B with great force and velocity assumes a circular or rotative motion in the casing C, about the axis thereof, whereby the dust particles contained in the air-current are all thrown into the outer layer of the air-current against the inner side of the casing. The air-current continues its rotative or gyrating movement in the case C until it escapes at the open ends $d$ of the case.

$e$ represents the dust-discharge opening, consisting of a horizontal slot formed in the case C, at a suitable distance from the inlet-opening $c$. The rear edge, $e'$, of the slot $e$ stands nearer the center of gyration than the front edge, so that the slot will skim off the thin layer of air and dust which is driven along the wall of the case C and discharge it into the dust chamber F.

$f$ represents a section of bolting-cloth, or other finely-perforated material, arranged in the case C and forming part of its peripheral wall. The bolting-cloth $f$ is supported on ribs $f'$, which divide the space behind the cloth into a number of independent chambers, $g$, each of which is provided with an adjustable discharge-valve $g'$. The very fine dust passes through the meshes of the bolting-cloth into the chambers $g$, and thence into a dust-chamber, F'. By regulating the discharge-openings of the chambers g, by means of the valves g', the air which passes through the front portion of the bolting-cloth is prevented from returning into the case C through the rear portion of the bolting-cloth, which is liable to occur when the valves are omitted.

H represents a curved pipe which connects at one end with the dust-chamber F and opens with the other end in the center of the separating-case C, thereby permitting the air, which is forced into the dust chamber through the dust-discharge opening e, to return to the case C and supply the partial vacuum which is created in the central portion of the case by the gyrations of the air-current along the wall of the case, and at the same time relieving any overpressure in the dust-chamber. H' is a similar pipe which connects the dust-chamber F' with the central portion of the case C. The pipes H H' are separated in the center of the case C by a partition, h, and are provided with openings i i' on opposite sides of said partition. The pipes H H' establish an air-circuit through the case C and the dust-chambers, and maintain an equilibrium in these parts, thereby preventing the air in the dust-chambers from being so much compressed as to resist the entrance of the dust and air and impair the working of the machine, while any fine particles of dust which may escape from the dust-chambers through the relief-passages H H' are returned to the case C and prevented from escaping into the surrounding atmosphere. The relief pipe or pipes H H' may be connected with the spout B through which the dust-laden air enters the separating-case, as represented in Fig. 5.

The open ends d of the case C are provided with annular guard-flanges j, projecting inwardly from the case, and collars j', secured in the openings of the guard-flanges, whereby the dust, which is driven along the inner side of the case C by the gyrations of the air-current, is prevented from escaping at the ends of the case into the surrounding atmosphere.

K is a conveyer arranged in a trough which receives the dust from the chambers F F', and which discharges the dust through suitable slides, k, or otherwise. If it is desired to collect the fine dust and the coarse dust separately, each of the chambers F F' is provided with a separate conveyer or discharge device.

It is obvious that the separating-case C may be constructed with a single end opening, d, and also that only one dust-chamber may be employed, if preferred.

The dust-laden air-current enters the case C through the spout B, and is deflected by the case out of its course and compelled to assume a circular or gyrating motion in the case, whereby the dust particles are thrown out of the body of the rotating air-current and crowded against the inner side of the case until they reach one of the dust-discharge apertures, when they escape with the outer layer of air from the case and enter one of the dust-chambers F F', while the air which has been freed from the dust continues the gyrations until it reaches the openings in the collars j' at the ends of the case, when it escapes into the surrounding atmosphere. The openings in the collars j' are smaller in diameter than the case C, whereby the outer dust-laden stratum of air, which moves in contact with the inner side of the case, is prevented from escaping through said openings, only the inner pure stratum of air being permitted to escape.

The bolting-cloth section is useful in intercepting the finest dust particles before the dust reaches the discharge-opening e; but it may be omitted, or a second slot or opening may be substituted in its place. The air-spout B is preferably made as wide as the length of the case C will permit.

I do not in this application claim the herein-described method of separating dust from air, but reserve the right to claim this method in a separate application.

I claim as my invention—

1. In a dust-collector, the combination, with a separating-case through which the dust-laden air moves with a rotative or gyrating motion, and which is provided with a spout through which the dust-laden air enters, a peripheral opening for the discharge of the outer layer of dust and air, and an opening for the escape of the inner body of purified air, of a chamber which receives the outer layer of dust and air from the peripheral discharge-opening, and an air-passage through which the air escapes from the dust-chamber while the dust remains in the same, substantially as set forth.

2. The combination, with a dust-separating case, C, having an end opening, d, provided with a guard-flange, j', for the escape of the purified air, and a peripheral dust-discharge orifice, e, of a tangential air-spout, B, through which the dust-laden air enters the case, and a dust-chamber, F, provided with a passage for the escape of the air, substantially as set forth.

3. The combination, with the separating-case C, having an air-inlet spout, B, an air-outlet, d, at its end, and a dust-discharge orifice, e, of the dust-chamber F, and a passage, H, connecting said chamber with the interior of the case, substantially as set forth.

4. In a dust-collector, a separating-case, C, having an air-inlet spout, B, an air-outlet at each end, and small and large dust-discharge orifices for removing the fine and coarse dust particles separately, and dust-collecting chambers, substantially as set forth.

5. The combination, with the separating-case C, having an air-inlet spout, B, an air-outlet at its end, and a perforated section, f, of chambers g, arranged in rear of said section and provided with adjustable valves g', and a dust-chamber inclosing said chambers g, substantially as set forth.

Witness my hand this 11th day of May, 1885.

JOHN M. FINCH.

Witnesses:
JNO. G. MUNDY,
CHAS. D. FARR.